(12) United States Patent
Hoshihara et al.

(10) Patent No.: US 6,715,835 B2
(45) Date of Patent: Apr. 6, 2004

(54) SEAT RECLINING APPARATUS (75) Inventors: Naoaki Hoshihara, Aichi-ken (JP);
Yasuhiro Kojima, Kariya (JP);
Yukifumi Yamada, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/941,640

(22) Filed: Aug. 30, 2001

(65) Prior Publication Data
US 2002/0033627 A1 Mar. 21, 2002

(30) Foreign Application Priority Data
Aug. 30, 2000 (JP) ......................................... 2000-261793

(51) Int. Cl.[7] .................................................. B60N 2/02
(52) U.S. Cl. ........................ 297/366; 297/367; 297/369
(58) Field of Search .................................. 297/367, 366, 297/369

(56) References Cited

U.S. PATENT DOCUMENTS

| | | | |
|---|---|---|---|
| 5,762,400 A | * | 6/1998 | Okazaki et al. ............. 297/367 |
| 5,779,313 A | | 7/1998 | Rohee |
| 5,788,325 A | * | 8/1998 | Ganot .................... 297/216.14 |
| 5,816,656 A | * | 10/1998 | Hoshihara et al. ..... 297/216.12 |
| 6,325,458 B1 | * | 12/2001 | Rohee et al. ................ 297/367 |
| 6,332,649 B1 | * | 12/2001 | Vossmann ................... 297/366 |
| 6,390,557 B1 | * | 5/2002 | Asano ......................... 297/367 |

* cited by examiner

Primary Examiner—Peter M. Cuomo
Assistant Examiner—Erika Garrett
(74) Attorney, Agent, or Firm—Burns, Doane, Swecker & Mathis, LLP (57) ABSTRACT

To provide a smaller sized seat reclining apparatus, the seat reclining apparatus includes an outer gear portion, a first engaging portion which is formed at a pawl and which is capable of being engaged with a mesh regulation portion, a second engaging portion which is formed at the pawl and which is capable of being engaged with the urging member, and an associating portion which is formed at the pawl and which transmits rotation of the urging member to the pawl to slide when engaged with the urging member. The outer gear portion, the first engaging portion, the second engaging portion, and the associating portion are arranged in such an order along the radially inward direction of the pawl.

24 Claims, 9 Drawing Sheets

SEAT RECLINING APPARATUS

The present application is based on and claims priority under 35 U.S.C § 119 with respect to Japanese Patent Application No. 2000-261793 filed on Aug. 30, 2000, the entire content of which is incorporated herein by reference.

FIELD OF THE INVENTION

The present invention is generally directed to a vehicle seat. More particularly, the present invention pertains to a vehicle seat reclining apparatus for adjusting the reclining angle of a seat back relative to a seat cushion so as to be fixed at a desired angular position.

BACKGROUND OF THE INVENTION

An example of a known seat reclining apparatus is disclosed in U.S. Pat. No. 5,779,313. This known seat reclining apparatus includes a lower arm secured to a seat-cushion, an upper arm fixed to a seat-back and pivotally connected to the lower arm, an inner gear portion formed in the upper arm, and a pawl slidably mounted on the lower arm. The pawl has an outer gear portion which is capable of being engaged with the inner gear portion and is movable between a meshed position at which the inner gear portion is in meshing engagement with the outer gear portion and a mesh-released position at which the inner gear portion is out of meshing engagement with the outer gear portion. A mesh regulation portion is formed at the upper arm to hold the pawl in its mesh-released position when engaged with the pawl, and an urging member is rotatably supported by the lower arm and holds the pawl in its meshed position when engaged with the pawl.

In this known seat reclining apparatus, a cam is provided with a first projection which engages the mesh regulation portion, a second projection by which the urging member and the pawl are associated with each other, and a cam surface which engages the urging member. The outer gear portion and the cam surface are formed on outer and inner surfaces of the pawl, respectively. The first projection and the second projection are formed by half die stamping on the pawl such that the first and second projections project in the thickness direction of the pawl.

With the aforementioned structure, the engagement between the cam surface of the pawl and the urging member causes the pawl to be held in the meshed position, whereby the outer gear portion of the pawl is held to mesh with the inner gear portion of the upper arm to restrict the upper arm rotation relative to the lower arm. On the other hand, rotating the urging member results in the pawl being shifted from its meshed position to the mesh-released position by urging the second projection while the engagement between the cam surface of the pawl and the urging member is released. In addition, the first projection of the pawl is brought into engagement with the mesh regulation portion to hold the pawl in its mesh-released position so that the outer gear portion of the pawl is kept released from the inner gear portion of the upper arm. Thus, the upper arm is allowed to rotate relative to the lower arm.

In the aforementioned known seat reclining apparatus, the cam surface is formed on the inner surface of the pawl and the outer gear portion is formed on the outer surface of the pawl. Further the first and second projections are formed on the pawl in the thickness direction of the pawl. Therefore, the width of the pawl from the cam surface to the outer gear portion is necessarily large to comprise the projections. This configuration results in the known seat reclining apparatus being relatively large in terms of its diameter.

Reducing the size of the apparatus in the radial direction could be established by making the radial dimension of the urging member smaller. However, in such a case, to release the engagement between the cam surface of the pawl and the urging member, the rotation angle range of the urging member should be larger, and this arrangement has the potential for resulting in a bad operational feeling.

Thus, a need exists for a seat reclining apparatus having a smaller size, particularly in terms of its diameter.

SUMMARY OF THE INVENTION

According to one aspect of the invention, a seat reclining apparatus includes a lower arm adapted to be secured to a seat-cushion, an upper arm adapted to be fixed to a seat-back and pivotally connected to the lower arm, an inner gear portion formed in the upper arm, and a pawl slidably mounted on the lower arm and having an outer gear portion which is engageable with the inner gear portion. The pawl is movable between a meshed position at which the inner gear portion is in meshing engagement with the outer gear portion and a mesh-released position at which the inner gear portion is out of meshing engagement with the outer gear portion. A mesh regulation portion is formed at the upper arm and holds the pawl in its mesh-released position when engaged with the pawl, an urging member is rotatably supported by the lower arm and holds the pawl in its meshed position when engaged with the pawl, a first engaging portion is formed at the pawl and is adapted to engage the mesh regulation portion, and a second engaging portion is formed at the pawl and is adapted to engage the urging member. An associating portion is also formed at the pawl and transmits rotation of the urging member to the pawl to slide when engaged with the urging member. The outer gear portion, the first engaging portion, the second engaging portion, and the associating portion are arranged in such an order along the radially inward direction of the pawl.

Preferably, the pawl is formed with a stepped portion so that the pawl has a radially inward portion and a radially outward portion which are of different phases or are axially offset with respect to thickness direction of the pawl. The stepped portion has an inside surface opposing the urging member and on which the second engaging portion is formed, while the stepped portion has an outside surface opposing the mesh regulation portion and on which the first engaging portion is formed.

The associating portion is preferably formed at the radially inward portion and is located more radially inward than the stepped portion of the pawl, while the first engaging portion is formed at the radially outward portion and is located more radially outward than the stepped portion of the pawl.

According to another aspect of the invention, a seat reclining apparatus includes a lower arm adapted to be secured to a seat-cushion, an upper arm adapted to be fixed to a seat-back and pivotally connected to the lower arm, an inner gear portion formed at the upper arm, and a pawl slidably mounted on the lower arm. The pawl has a stepped portion so that the pawl includes a radially inward portion that is axially offset from a radially outward portion, with the radially inward portion having a radially inwardly facing end surface and the radially outward portion having an outer gear portion. The pawl is movable between a meshed position at which the inner gear portion is in meshing engagement with the outer gear portion and a mesh-released position at which the inner gear portion is out of meshing engagement with the outer gear portion. A mesh regulation portion is formed at the upper arm to hold the pawl in the mesh-released position when the mesh regulation portion is engaged with the pawl and an urging member is rotatably supported by the lower arm to hold the pawl in the meshed position when the urging member is engaged with the pawl. A first engaging portion is formed at the pawl and adapted to engage the mesh regulation portion, and a second engaging portion is formed at the pawl and is adapted to engage the urging member. One of the urging member and the pawl is provided with a pin that engages a slot in the other of the urging member and the pawl so that rotation of the urging member causes sliding movement of the pawl. The second engaging portion is positioned radially outward of the end surface of the radially inward portion of the pawl.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
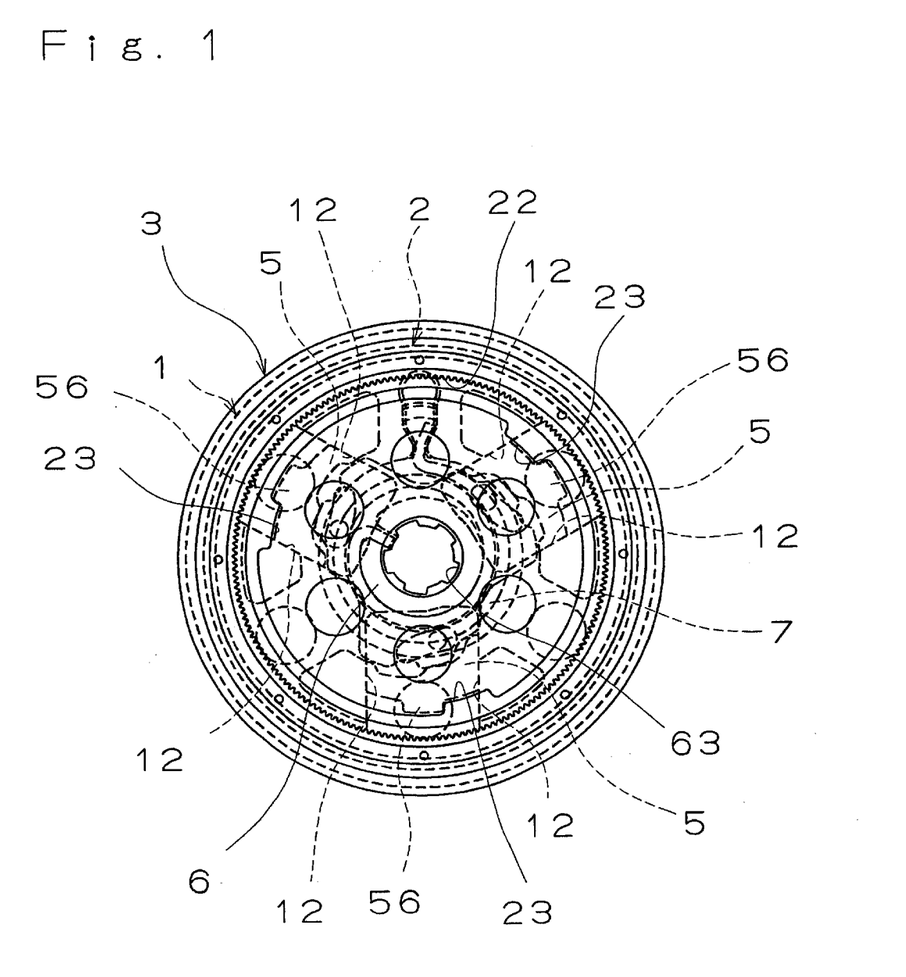
FIG. 1 illustrates a front view of a seat reclining apparatus in accordance with the present invention.
Figure 2:
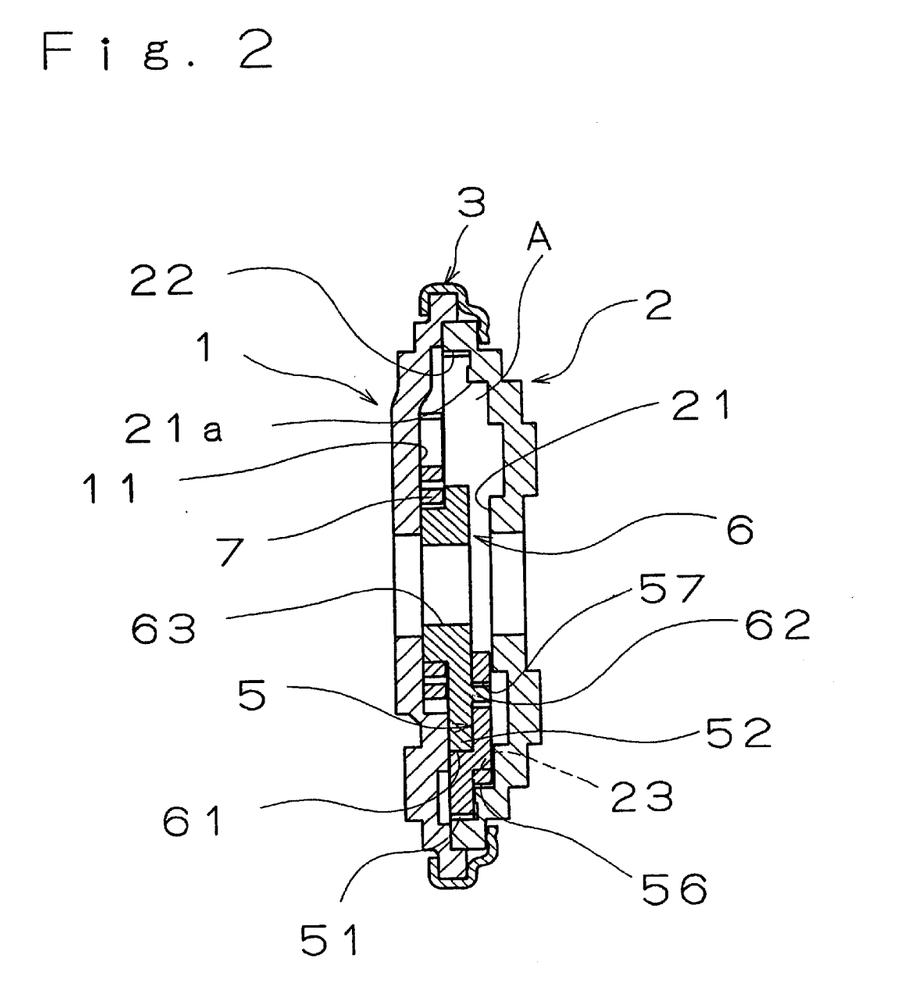
FIG. 2 illustrates a cross-sectional view of the seat reclining apparatus which is illustrated in FIG. 1.

Referring initially to FIGS. 1 and 2, a seat reclining apparatus includes a lower arm 1 adapted to be fixed to a seat cushion (not shown) and an upper arm 2 adapted to be fixed to a seat back (not shown). The upper arm 2 is positioned in a somewhat overlapping or generally layered relationship, in its thickness direction (corresponding to the horizontal direction in FIG. 2), with the lower arm 1. The outer periphery of the upper arm 2 is rotatably supported to the lower arm 1 by way of a ring member 3. The lower arm 1 and the upper arm 2 can be formed using a half die stamping method, and are positioned relative to one another to define an inner space A between the lower arm 1 and the upper arm 2. As illustrated, the lower arm 1 and the upper arm 2 contact one another along their outer peripheries.

The lower arm 1 supports a rotation shaft 4 (shown in FIG. 3) in a rotatable fashion, with the rotation shaft 4 extending through the inner space A and the upper arm 2. The upper arm 2 is rotatable about this rotation shaft 4 relative to the lower arm 1. The outer surface of the rotation shaft 4 is provided with a spline structure defined by a plurality of projections arranged parallel to one another and extending in the axial direction. In addition, a concavity 11 is formed in the lower arm 1 to define a centrally located recessed region. The center of the concavity or recessed region 11 coincides with the rotation shaft 4 and is continuous with or communicates with the inner space A.

Figure 7:
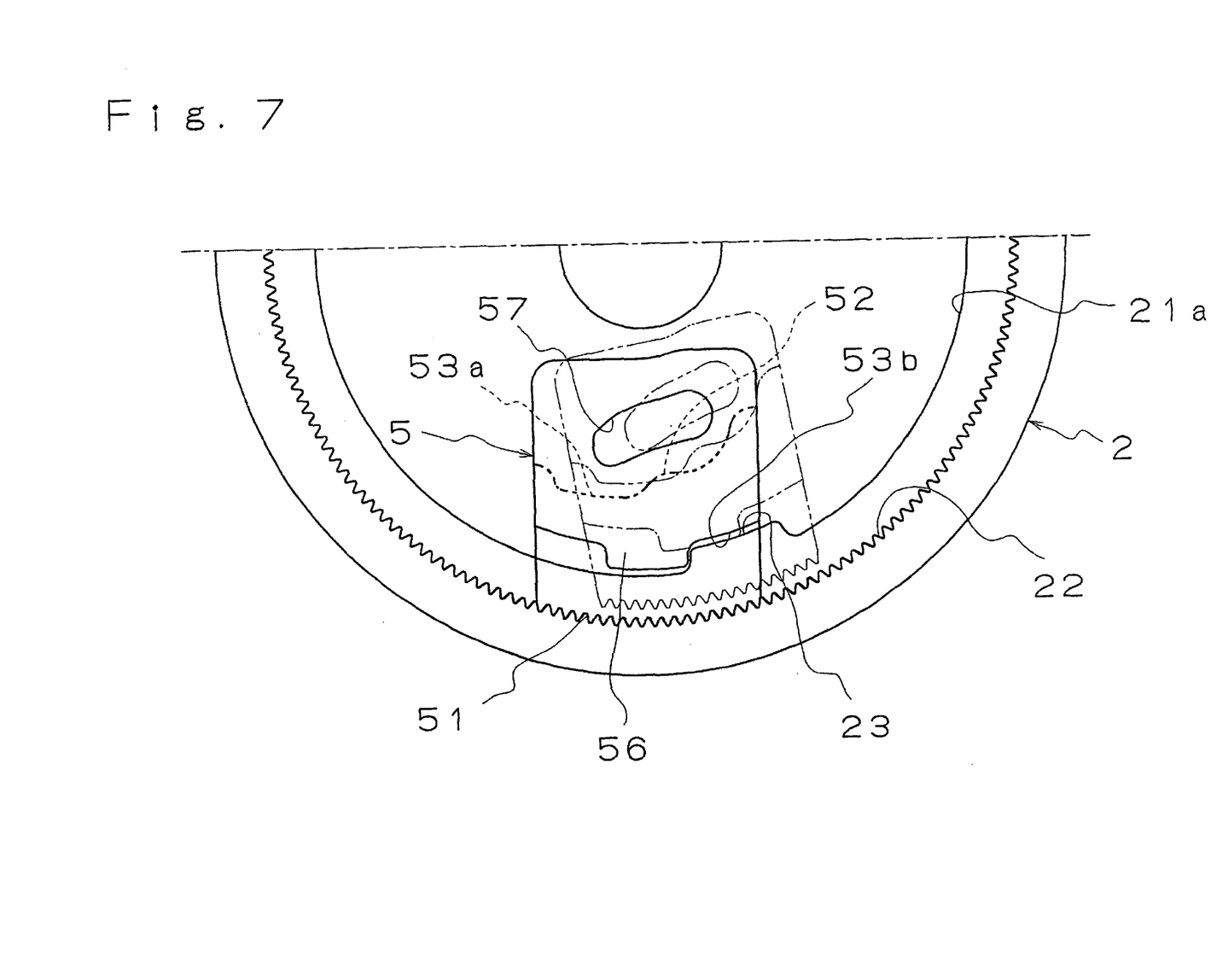
FIG. 7 illustrates a perspective view representing how the seat reclining apparatus operates which is illustrated in FIG. 1.

In addition, a concavity 21 is formed in the upper arm 2 to define a recessed region in the upper arm 2. The center of the concavity or recessed region 21 coincides with the rotation shaft 4 and is continuous with or communicates with the inner space A. The inwardly facing wall 21a surrounding the concavity 21 is provided with three radially inwardly directed projections 23 which project toward the rotation shaft 4 as shown in FIGS. 1 and 7.

Figure 3:
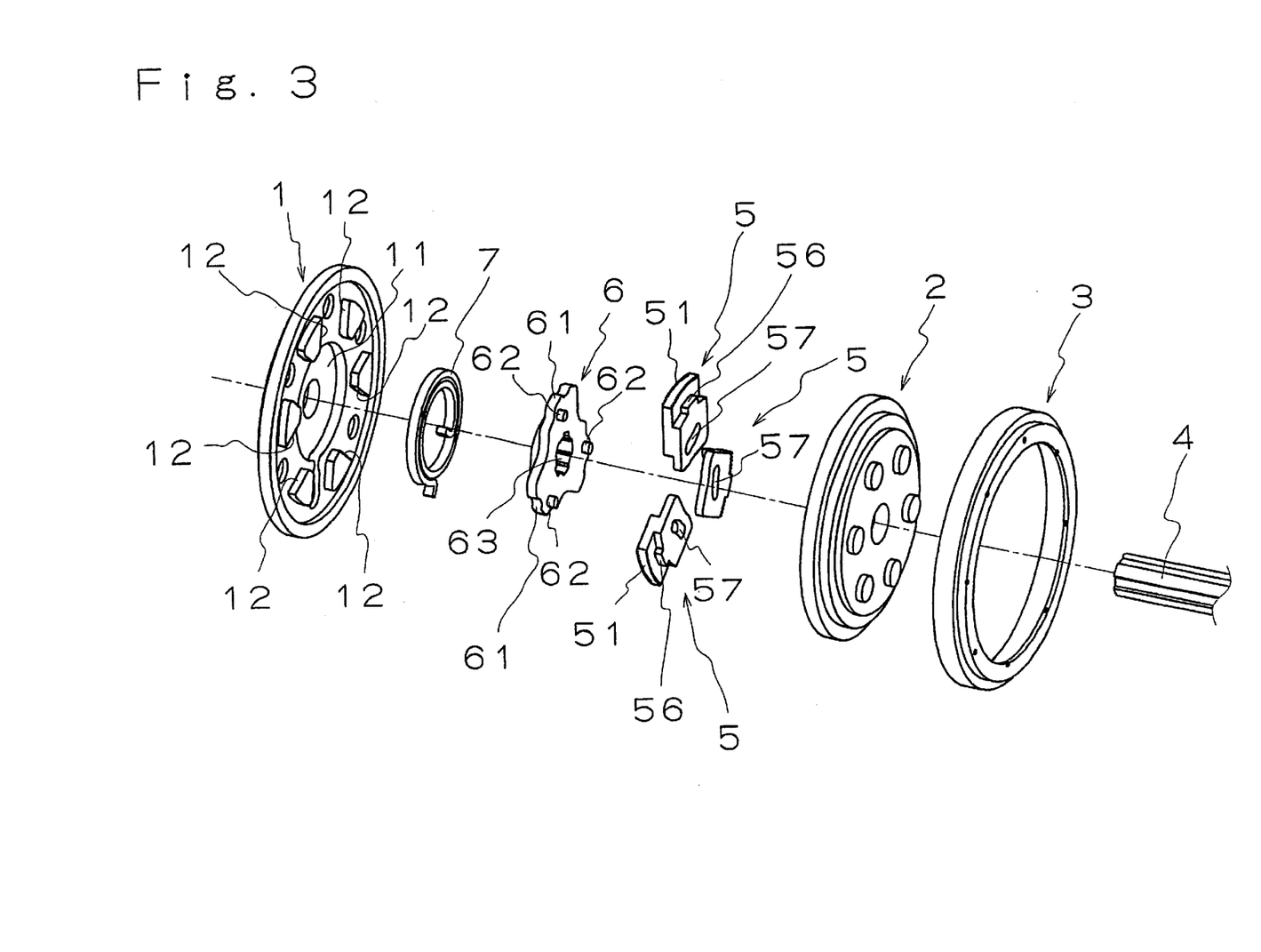
FIG. 3 illustrates an exploded perspective view of the seat reclining apparatus which is illustrated in FIG. 1.
Figure 4:
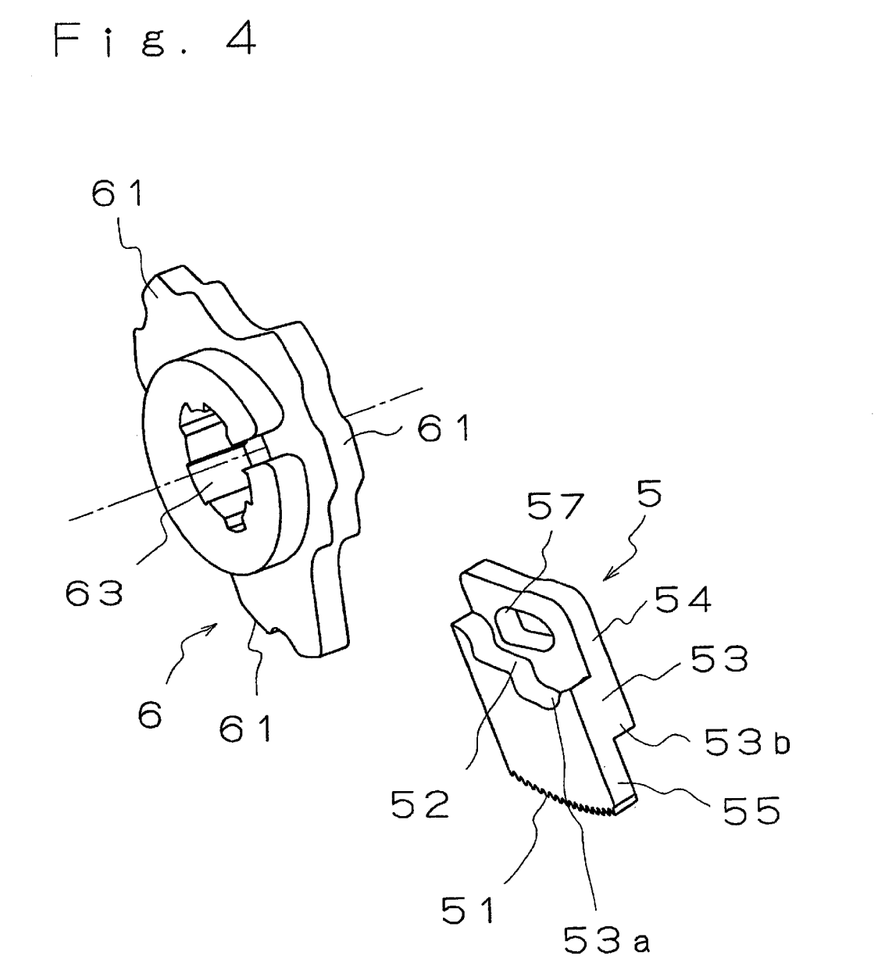
FIG. 4 illustrates a perspective view of a pawl, when viewed from a lower arm side, of the seat reclining apparatus which is illustrated in FIG. 1.

As can be seen from FIGS. 1–3, the lower arm 1 is provided with three equally-pitched pairs of opposing parallel guide surfaces 12, 12 extending in the radial direction toward the rotation shaft 4. The upper arm 2 is provided with an annularly extending inner gear portion 22. This gear portion 22 can be formed during the aforementioned half die stamping method so as to be placed outside of the inner surface 21a of the concavity 21 in the inner space A.

Three pawls 5 are positioned in the inner space A. Each of the pawls 5 is positioned between one of the pairs of guide surfaces 12, 12 so as to be supported by the lower arm 1 with an adequate clearance to establish or permit slidable engagement between the lower arm 1 and the pawls 5. Each of the pawls 5 is provided with an outer gear portion 51 and a projection 52.

Figure 6:
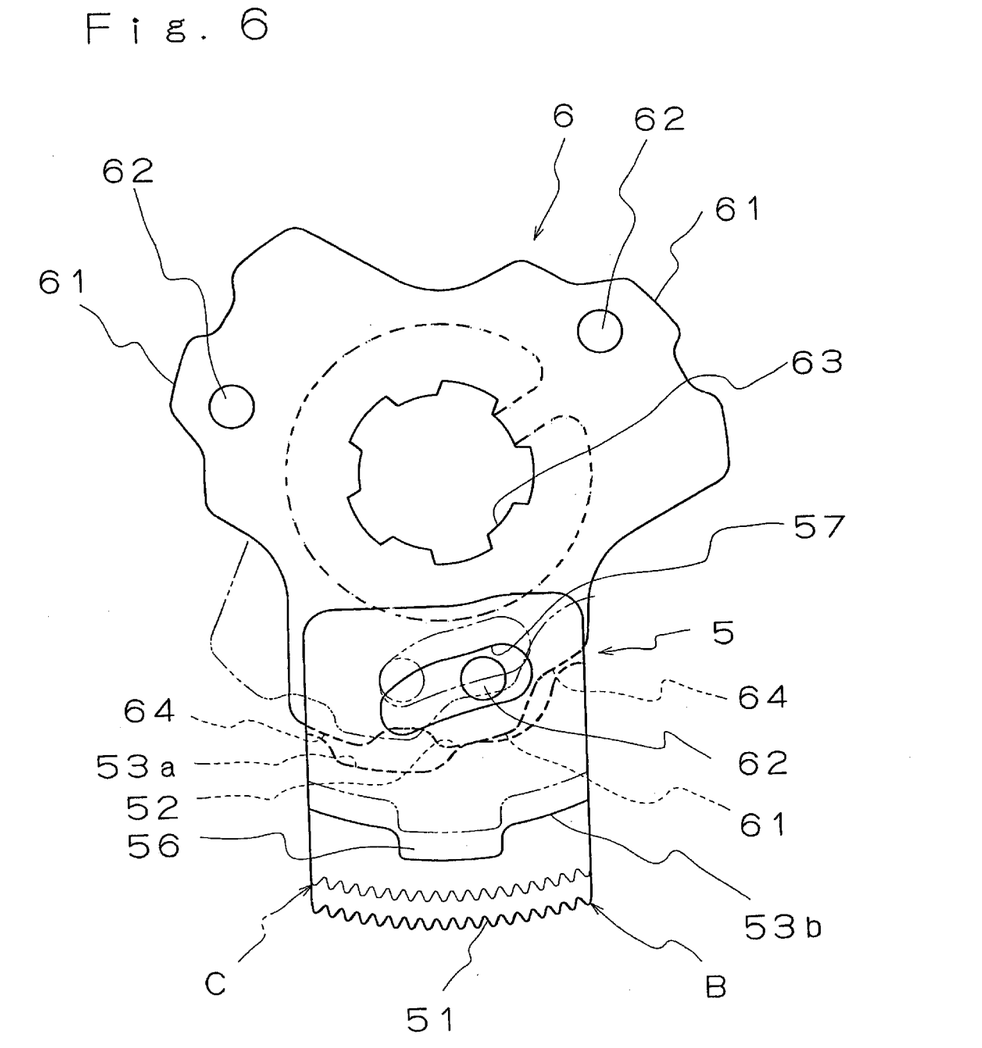
FIG. 6 illustrates a front view representing how the seat reclining apparatus operates which is illustrated in FIG. 1.

Referring to FIG. 6, each pawl 5 is slidably movable between a meshed position B (indicated by the solid line in FIG. 6) at which the inner gear portion 22 of the upper arm 2 is in meshing engagement with the outer gear portion 51 of the pawl 5 and a mesh-released position C (indicated by the two-dotted line in FIG. 6) at which the inner gear portion 22 of the upper arm 2 is out of meshing engagement with the outer gear portion 51 of the pawl 5.

In addition, a cam 6 is provided in the inner space A. The cam 6 possesses an axially extending bore 63 on whose inner surface a spline is formed. The cam 6 is mounted on the rotation shaft 4 with the splines on the inner surface of the bore 63 engaging the splines on the rotation shaft 4 so that the cam 6 is rotatable together with the rotation shaft 4. The outer surface of the cam 6 is provided with three cam surfaces 61 which correspond to the three pawls 5. As will be described in more detail later, each cam surface 61 is adapted to be engaged with or disengaged from the projection 52 on one of the pawls 5 when the cam 6 rotates. As indicated by the solid line in FIG. 6, the cam 6 holds each pawl 5 in the meshed position B in such a manner that the engagement of the cam surface 61 with the projection 52 urges the outer gear portion 51 of the pawl 5 into meshing engagement with the inner gear portion 22 of the upper arm 2. A pressure angle is set for the cam surface 61 of the cam 6 so as not to allow sliding movement of the pawl 5 on the cam 6 when the outer gear portion 51 and the inner gear portion 22 are in meshing engagement.

A spiral spring 7 is accommodated in the concavity or recessed region 11 of the lower arm 1. The outer end of the spring engages the lower arm 1 while the inner end of the spring 7 engages the cam 6. By virtue of the urging force of the spiral spring 7 that is applied to the cam 6, the cam 6 is always biased in the counterclockwise direction in FIG. 1 so that the cam surface 61 of each cam 6 is in engagement with the projection 52 of the corresponding pawl 5.

As mentioned above, the outer surface of the pawl 5 is formed with the outer gear portion 51 which extends in an arc-shaped fashion and is adapted to mesh with the inner gear portion 22 of the upper arm 2. In addition, the pawl 5 is formed with a stepped portion 53 which forms a radially inward side of the pawl 5 (i.e., a lengthwise inside of the pawl 5 which is near to the cam 6) and a radially outward side of the pawl 5 (i.e. a lengthwise outside of the pawl 5 which is remote from the cam 6), the two of which are out of coplanar relationship with one another in the thickness direction (i.e. the horizontal direction in FIG. 2) of the pawl 5. Thus, the stepped portion 53 provides a radially inward portion 54 and a radially outward portion 55 that are axially offset from one another and form an inside surface 53a and an outside surface 53b. The radially inward portion 54 of the pawl 5 is positioned within the concavity or recessed region 21 of the upper arm 2 so as to overlie or be layered with the cam 6 in the thickness direction of the pawl 5 and makes the outside surface 53b opposed to the inner surface 21a of the concavity 21 of the upper arm 2. The radially outward portion 55 of the pawl 5 is accommodated within the inner space A so that the inside surface 53a is opposed to the cam 6 and the outer gear portion 51 is opposed to the inner gear portion 22 of the upper arm 2.

A projection 52 which is adapted to engage with or be disengaged from the cam surface 61 of the cam 6 is formed substantially at a center portion in the width-wise direction (i.e. in the horizontal direction in FIG. 6) on the inside surface 53a of the pawl 53. As an alternative, the projection 52 can be formed on the cam 6 while the cam surface 61 is formed on the pawl 5.

Figure 5:
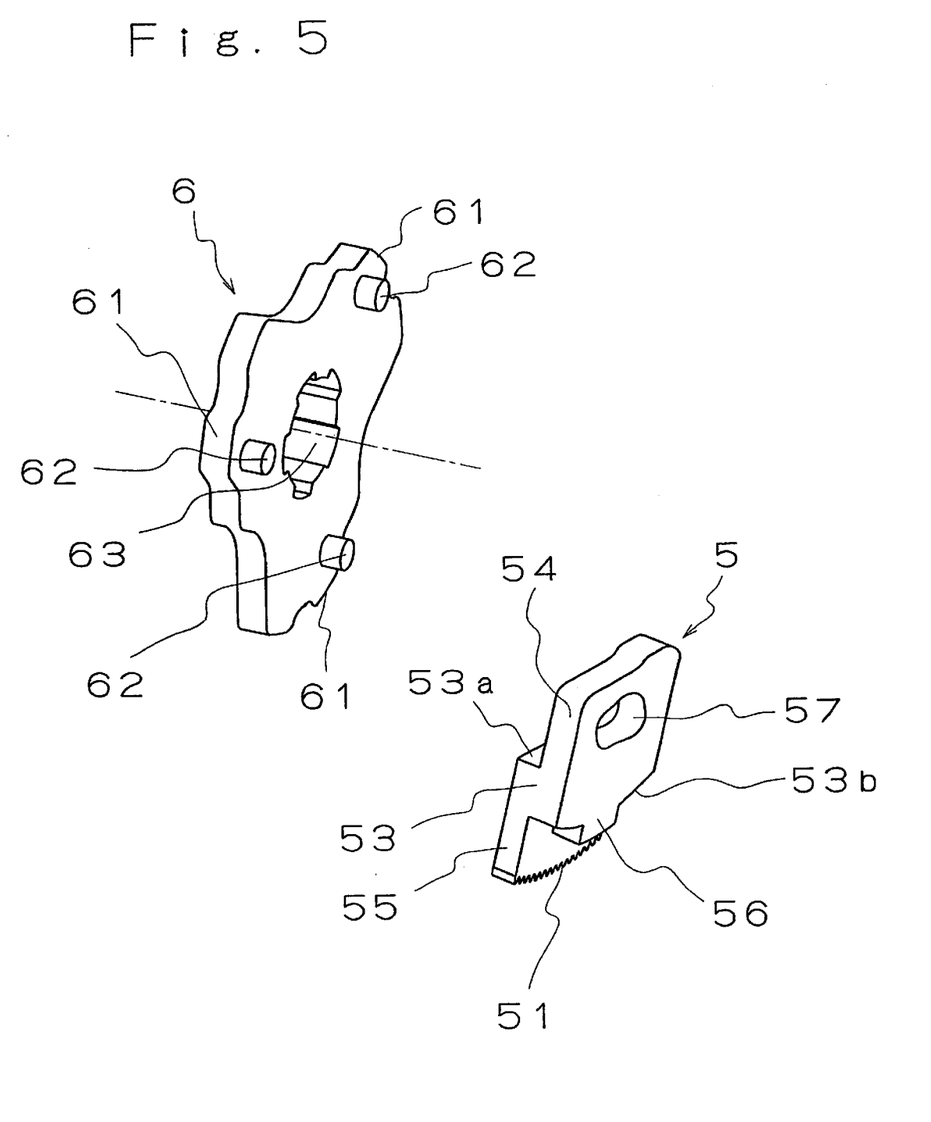
FIG. 5 illustrates a perspective view of a pawl, when viewed from an upper arm side, of the seat reclining apparatus which is illustrated in FIG. 1.

As shown in, for example, FIG. 5, a convexity or projection 56 is formed on the outer surface 53b of each pawl 5. This projection 56 on each pawl is adapted to be engaged, in a riding or sliding fashion, with one of the projections 23 of the concavity or recessed region 21 of the upper arm 2. The projection 56 on the pawl 5, when engaged with the respective projection 23 at the recessed region 21, holds the pawl 5 in its mesh-released position C. The projection 23 is dimensioned to extend by an amount which is set such that upon riding on or sliding on the projection 56 of the pawl 5, the outer gear portion 51 is out of meshing engagement with the inner gear portion 22 of the upper arm 2.

The cam 6 is formed with three pins 62 which correspond to the three pawls 5. The radially inward portion 54 of each pawl 5 is formed with a cam groove or slot 57 that receives one of the pins 62 such that the pin 62 is in sliding engagement with the cam groove or slot 57. As a result, when the cam 6 is rotated, the resulting relative movement between the pin 62 and the cam slot 57 causes the pawl 5, due to the cam action of the cam slot 57, to slide along the respective pair of guide surfaces 12, 12. As an alternative, the cam slot 57 and the pin 62 can be formed on the cam 6 and the pawl 5, respectively.

In addition, the cam 6 is formed with three pairs of projections 64, 64 which are opposed, with a clearance, to the inside surface 53a of the respective pawl 5 in such a manner that the projections 64, 64 are adapted to engage the inside surface 53a of the pawl 5. Each of the cam surfaces 61 is positioned between a pair of the projections 64, 64 in the width-wise direction. When the projections 64, 64 are brought into engagement with the inside surface 53a of the respective pawl 5, the resulting state restricts inclination of the pawl 5, upon its deformation, relative to the guide surfaces 12, 12.

Having described the structure associated with the seat reclining apparatus, the operation of the apparatus will now be explained. FIGS. 1 and 2 illustrate the state in which the upper arm 2 is restricted from rotating relative to the lower arm 1. Under such a state, as shown by the solid line in FIG. 6, due to the engagement between the inside surface 53a of the pawl 5 and the cam surface 61 of the cam 6, the pawl 5 is held in the meshed position B. In this position, the outer gear portion 51 of the pawl 5 is urged in a direction for being in meshing engagement with the inner gear portion 22 of the upper arm 2. The pawl 5 is restricted from sliding while the outer gear portion 51 of the pawl 5 is in meshing engagement with the inner gear portion 22 of the upper arm 2.

Under the above described state, if the rotation shaft 4 is rotated in one direction by manipulating an operation lever, the cam 6 is rotated in the clockwise direction in FIG. 6 against the urging force of the spiral spring 7 and is positioned at the two-dotted position in FIG. 6. By virtue of this rotation of the cam 6, the engagement between each projection 52 of the pawl 5 and the cam surface 61 of the corresponding cam 6 is released. Thus, the pawls 5 are caused to slide along the respective pairs of guide surfaces 12, 12 of the lower arm 1. The clockwise rotation of the cam 6 in FIG. 6 causes the pawls 5 to slide to the mesh-released position C indicated by the two-dotted line. The release of the meshing engagement between the outer gear portion 51 of the pawl 5 and the inner gear portion 22 of the upper arm 2 makes it possible to rotate the upper arm 2 relative to the lower arm 1.

If the operation lever is released, the urging force of the spiral spring 7 returns the cam 6 to its original position B indicated by the solid line in FIG. 6. Then, the pawl 5 is brought into reverse sliding movement to be positioned at the meshed position at which the outer gear portion 51 of the pawl 5 is once again brought into meshing engagement with the inner gear portion 22 of the upper arm 2. Thus, the upper arm 2 is restricted from rotating relative to the lower arm 1.

When the pawl 5 is held in the mesh-released position C, and the projection 56 of the pawl 5 is brought into opposition to the convexity or projection 23 of the upper arm 2 by rotating the upper arm 2 relative to the lower arm 1, even if the operation lever is released for returning the cam 6 to the solid line illustrated position in FIG. 6, the projection 56 of the pawl 5 contacts the projection 23 on the upper arm 2 and so the pawl 5 does not slide. The pawl 5 is thus held in the mesh-released position C. Thus, without manipulating the operation lever, it is possible to rotate the upper arm 2 relative to the lower arm 1. This holding of the pawl 5 in the mesh-released position C benefits in making the seat back frontward inclination and the seat fully flatted.

Figure 8:
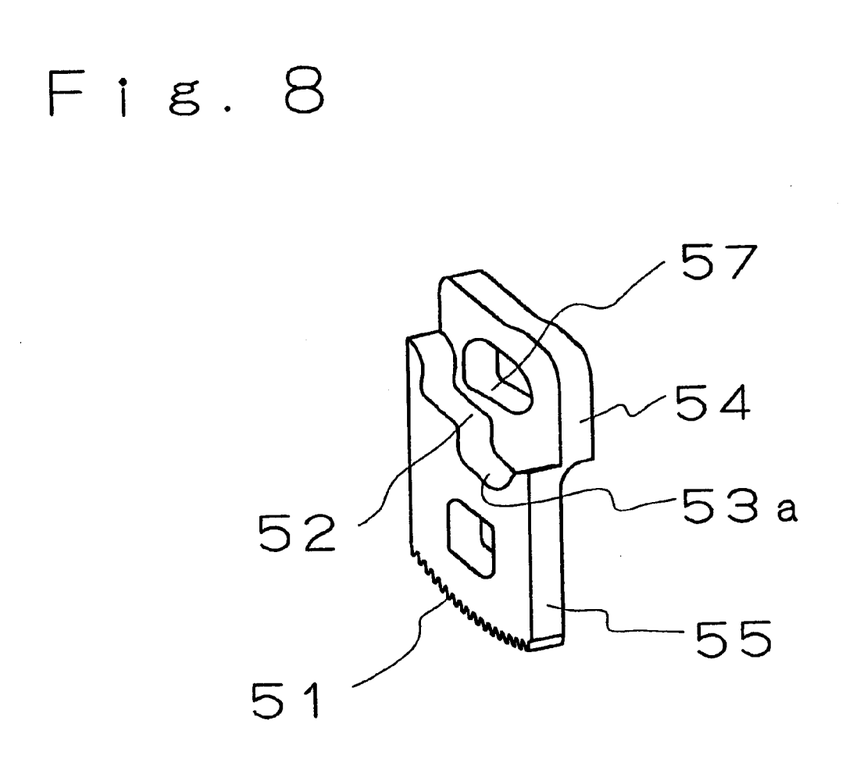
FIG. 8 illustrates a perspective view of an alternative example of the pawl, when viewed from the upper arm side, of the seat reclining apparatus which is illustrated in FIG. 1.
Figure 9:
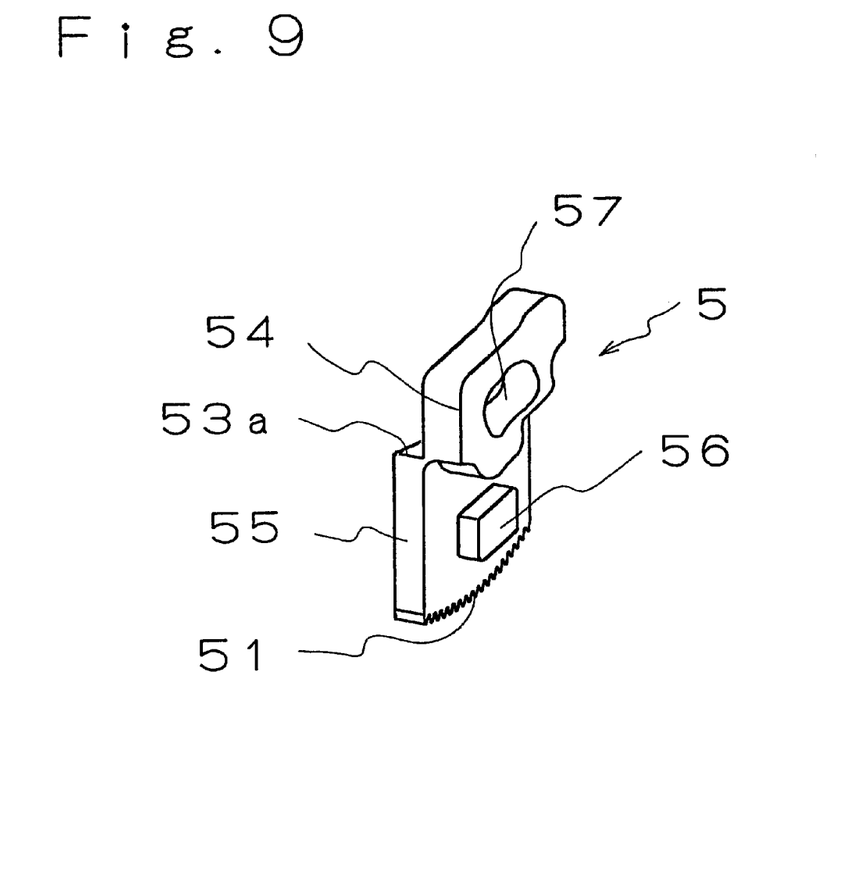
FIG. 9 illustrates a perspective view of the alternative example of the pawl which is illustrated in FIG. 8, when viewed from the lower arm side, of the seat reclining apparatus which is illustrated in FIG. 1.

In the present embodiment, the pawl 5 can be formed by, for example, cutting, forging, or sintering, to have the projection 56 on the outside surface 53b. Instead, as illustrated in FIGS. 8 and 9, the projection 56 can be provided on the radially outward portion 55 through formation of the pawl 5 by half die stamping. Thus, in the embodiment of the pawl 5 shown in FIG. 5, the projection 56 extends radially outwardly from the radially outwardly facing surface 53b of the radially inward portion 54 whereas in the embodiment of the pawl 5 shown in FIGS. 8 and 9, the projection 56 extends from the surface of the radially outward portion 55 that faces towards the upper arm 2 so that the projection 56 extends axially towards the upper arm 2.

It is to be understood that although the described and illustrated seat reclining apparatus is provided with three pawls 5, the present invention can also be applied to a seat reclining apparatus having a single pawl, a pair of pawls, or four or more pawls.

In accordance with the present invention, the outer gear portion 51, the first engaging portion constituted by the projection 56, the second engaging portion constituted by the inside surface 53a, and the associating portion constituted by the slot 57 are arranged in such order along the radially inward direction of the pawl. This makes it possible to bring the pawl in layer with the urging member in the thickness direction, and so the seat reclining apparatus can be made smaller with respect to its radial size. In addition, the seat reclining apparatus of the present invention can provide sufficiently large dimension for the urging member with respect to its radial size, thus making it possible to reduce or avoid poor operation feeling.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining apparatus comprising:
   a lower arm adapted to be secured to a seat-cushion;
   an upper arm adapted to be fixed to a seat-back and pivotally connected to the lower arm;
   an inner gear portion formed at the upper arm;
   a pawl slidably mounted on the lower arm and having an outer gear portion, the pawl being movable between a meshed position at which the inner gear portion is in meshing engagement with the outer gear portion and a mesh-released position at which the inner gear portion is out of meshing engagement with the outer gear portion;
   a mesh regulation portion formed at the upper arm to hold the pawl in the mesh-released position when the mesh regulation portion is engaged with the pawl;
   an urging member rotatably supported by the lower arm to hold the pawl in the meshed position when the urging member is engaged with the pawl;
   a first engaging portion formed at the pawl and adapted to engage the mesh regulation portion;
   a second engaging portion formed at the pawl and adapted to engage the urging member;
   an associating portion formed at the pawl to transmit rotation of the urging member to cause the pawl to slide when engaged with the urging member; and
   the outer gear portion, the first engaging portion, the second engaging portion, and the associating portion being arranged in such order along a radially inward direction of the pawl.

2. The seat reclining apparatus as set forth in claim 1, wherein the pawl is formed with a stepped portion providing a radially inward portion and a radially outward portion which are out of coplanar relationship with each other in a thickness direction of the pawl.

3. The seat reclining apparatus as set forth in claim 2, wherein the stepped portion has an inside surface opposing the urging member on which the second engaging portion is formed.

4. The seat reclining apparatus as set forth in claim 3, wherein the stepped portion has an outside surface opposing the mesh regulation portion on which the first engaging portion is formed.

5. The seat reclining apparatus as set forth in claim 4, wherein the associating portion is formed at the radially inward portion and is located more radially inward than the stepped portion of the pawl.

6. The seat reclining apparatus as set forth in claim 5, wherein the first engaging portion is formed at the radially outward portion and is located more radially outward than the stepped portion of the pawl.

7. The seat reclining apparatus as set forth in claim 2, wherein the stepped portion has an outside surface opposing the mesh regulation portion on which the first engaging portion is formed.

8. The seat reclining apparatus as set forth in claim 2, wherein the associating portion is formed at the radially inward portion and is located more radially inward than the stepped portion of the pawl.

9. The seat reclining apparatus as set forth in claim 2, wherein the first engaging portion is formed at the radially outward portion and is located more radially outward than the stepped portion of the pawl.

10. The seat reclining apparatus as set forth in claim 2, wherein the first engaging portion is a projection extending radially outwardly from a radially outwardly facing surface of the radially inward portion.

11. The seat reclining apparatus as set forth in claim 2, wherein the first engaging portion is a projection extending axially from the radially outward portion towards the upper arm.

12. A seat reclining apparatus comprising:
    a lower arm adapted to be secured to a seat-cushion;
    an upper arm adapted to be fixed to a seat-back and pivotally connected to the lower arm;
    an inner gear portion formed at the upper arm;
    a pawl slidably mounted on the lower arm, the pawl having a stepped portion so that the pawl includes a radially inward portion that is axially offset from a radially outward portion, the radially inward portion having a radially inwardly facing end surface, the radially outward portion having an outer gear portion, the pawl being movable between a meshed position at which the inner gear portion is in meshing engagement with the outer gear portion and a mesh-released position at which the inner gear portion is out of meshing engagement with the outer gear portion;
    an urging member rotatably supported by the lower arm to hold the pawl in the meshed position when the urging member is engaged with the pawl;
    an engaging portion formed at the pawl and adapted to engage the urging member;
    one of the urging member and the pawl being provided with a pin that engages a slot in the other of the urging member and the pawl so that rotation of the urging member causes sliding movement of the pawl; and
    the engaging portion being positioned radially outward of the end surface of the radially inward portion of the pawl.

13. The seat reclining apparatus as set forth in claim 12, wherein the engaging portion is a second engaging portion, and including a first engaging portion formed at the pawl, the first engaging portion being located radially outwardly of the second engaging portion.

14. The seat reclining apparatus as set forth in claim 12, wherein the stepped portion has an inside surface opposing the urging member on which the engaging portion is formed.

15. The seat reclining apparatus as set forth in claim 12, wherein the slot is formed on the radially inward portion of the pawl and is located more radially inward than the stepped portion of the pawl.

16. The seat reclining apparatus as set forth in claim 12, wherein the engaging portion is a second engaging portion, and including a first engaging portion formed at the radially outward portion of the pawl and located more radially outward than the stepped portion of the pawl.

17. The seat reclining apparatus as set forth in claim 12, including a projection extending radially outwardly from a radially outwardly facing surface of the radially inward portion.

18. The seat reclining apparatus as set forth in claim 12, including a projection extending axially from the radially outward portion towards the upper arm.

19. The seat reclining apparatus as set forth in claim 12, including a mesh regulation portion formed at the upper arm to hold the pawl in the mesh-released position when the mesh regulation portion is engaged with the pawl, the engaging portion being a second engaging portion, and including a first engaging portion formed at the pawl and adapted to engage the mesh regulation portion.

20. The seat reclining apparatus as set forth in claim 19, wherein the stepped portion has an outside surface opposing the mesh regulation portion on which the first engaging portion is formed.

21. The seat reclining apparatus as set forth in claim 12, wherein the engaging portion formed at the pawl is engaged by the urging member to hold the pawl in the meshed position.

22. The seat reclining apparatus as set forth in claim 12, wherein the radially inward portion and the radially outward portion of the pawl are out of coplanar relationship with one another, the engaging portion of the pawl being coplanar with the outer gear portion of the pawl, the engaging portion of the pawl being positioned radially outward of the pin or slot that is provided in the pawl.

23. The seat reclining apparatus as set forth in claim 12, wherein the urging member includes a cam, the cam being mounted on a rotation shaft so that the rotation shaft and the cam rotate together.

24. The seat reclining apparatus as set forth in claim 12, wherein the radially inward portion of the pawl overlies the rotatable urging member.

\* \* \* \* \*